US012662235B2

(12) United States Patent
Seack et al.

(10) Patent No.: US 12,662,235 B2
(45) Date of Patent: Jun. 23, 2026

(54) LOAD INTRODUCTION SYSTEM AND METHOD FOR MANUFACTURING A LOAD INTRODUCTION SYSTEM

(71) Applicant: Airbus Operations GmbH, Hamburg (DE)

(72) Inventors: Oliver Seack, Hamburg (DE); Dort Daandels, Hamburg (DE); Kathrin Stubbe, Hamburg (DE); Tobias Ender, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 0 days.

(21) Appl. No.: 18/537,089

(22) Filed: Dec. 12, 2023

(65) Prior Publication Data

US 2024/0199195 A1    Jun. 20, 2024

(30) Foreign Application Priority Data

Dec. 14, 2022    (EP) ..................................... 22213598

(51) Int. Cl.
*B64C 9/02*        (2006.01)
*B64F 5/10*        (2017.01)

(52) U.S. Cl.
CPC . *B64C 9/02* (2013.01); *B64F 5/10* (2017.01)

(58) Field of Classification Search
CPC .................................... B64C 9/02; B64C 9/16
See application file for complete search history.

(56) References Cited

U.S. PATENT DOCUMENTS

| | | | | | |
|---|---|---|---|---|---|
| 4,381,093 | A | * | 4/1983 | Rudolph ................... | B64C 9/16 244/219 |
| 4,892,274 | A | * | 1/1990 | Pohl .......................... | B64C 9/16 244/215 |
| 7,510,151 | B2 | * | 3/2009 | Perez-Sanchez ......... | B64C 9/18 244/216 |

(Continued)

FOREIGN PATENT DOCUMENTS

| | | | | |
|---|---|---|---|---|
| EP | 2578489 | A2 | 4/2013 | |
| EP | 3323712 | A1 * | 5/2018 | ............... B64C 3/50 |

(Continued)

OTHER PUBLICATIONS

European Search Report for corresponding European Patent Application No. 22213598 dated May 12, 2023; priority document.

*Primary Examiner* — Joshua J Michener
*Assistant Examiner* — Michael B. Kreiner
(74) *Attorney, Agent, or Firm* — Greer, Burns & Crain, Ltd.

(57)    ABSTRACT

A load introduction system comprising an aerodynamic component having a skin section with an outer surface and a first protrusion, and an attachment unit for movably coupling the aerodynamic component to a base unit. The attachment unit is attached to the skin section of the aerodynamic component and to the first protrusion, wherein the first protrusion extends away from the aerodynamic outer surface, thereby separating a space adjacent the aerodynamic outer surface into a front space and a rear space. The attachment unit extends over the first protrusion such that the attachment unit comprises a front portion in the front space and a rear portion in the rear space. Also a method for manufacturing a load introduction system.

15 Claims, 4 Drawing Sheets

(56)     References Cited

U.S. PATENT DOCUMENTS

| | | | | |
|---|---|---|---|---|
| 8,517,315 | B2 * | 8/2013 | Andreani | B64C 9/16 |
| | | | | 244/215 |
| 9,004,405 | B2 * | 4/2015 | Goettinger | B29C 70/48 |
| | | | | 244/123.1 |
| 9,377,038 | B2 * | 6/2016 | David | F16B 5/00 |
| 10,131,418 | B2 * | 11/2018 | Seack | B64C 9/02 |
| 10,494,083 | B2 * | 12/2019 | Currie | B64C 3/50 |
| 10,759,516 | B2 * | 9/2020 | Kordel | B64C 3/187 |
| 11,059,563 | B2 * | 7/2021 | Gruner | B64C 9/16 |
| 11,192,628 | B2 * | 12/2021 | Tsai | B64C 13/16 |
| 11,447,233 | B2 * | 9/2022 | Gruner | B64C 9/18 |
| 11,692,586 | B2 * | 7/2023 | Gruner | F16D 9/06 |
| | | | | 29/525.01 |
| 11,933,353 | B2 * | 3/2024 | Smeal | B64C 9/16 |
| 2014/0154458 | A1 | 6/2014 | Zilberman et al. | |
| 2015/0329197 | A1 | 11/2015 | Seack et al. | |
| 2022/0185449 | A1 | 6/2022 | Glassmoyer et al. | |
| 2022/0299063 | A1 | 9/2022 | Smeal et al. | |

FOREIGN PATENT DOCUMENTS

| | | | |
|---|---|---|---|
| EP | 3575206 | A1 | 12/2019 |
| EP | 4059835 | A1 | 9/2022 |

* cited by examiner

LOAD INTRODUCTION SYSTEM AND METHOD FOR MANUFACTURING A LOAD INTRODUCTION SYSTEM

CROSS-REFERENCES TO RELATED APPLICATIONS

This application claims the benefit of European Patent Application Number 22213598.0 filed on Dec. 14, 2022, the entire disclosure of which is incorporated herein by way of reference.

FIELD OF THE INVENTION

The invention relates to improved attachment and load transmission concepts of aerodynamic structures. In particular, the invention relates to a load introduction system and a method for manufacturing a load introduction system.

BACKGROUND OF THE INVENTION

The transmission of loads among components of aerodynamic systems is an important aspect that has to be considered during the design process of such systems. For example, strength requirements, low manufacturing/assembly costs in combination with a reliable and stable manufacturing/assembly process are important aspects that have to be dealt with during the design process. When designing the corresponding components, load paths through these components can be analyzed and optimized so as to avoid load peaks in certain regions within the component structure. Such load peaks often occur at fastening elements like bolts which couple the components to each other. In order to reduce the load peaks at the fastening elements, an enlargement of the attachment field as well as the number of fastening elements may be considered. However, such an enlargement of the attachment field often requires an enlargement and reinforcement of the corresponding components which are attached to each other via the attachment field, thereby making the manufacturing process more sophisticated.

EP 3 575 206 A1 describes a system for driving a flap arrangement between a retracted position and an extended position, a wing having such a system as well as an aircraft.

EP 2 578 489 A2 describes a flap support structure for an aircraft wing having a trailing edge flap. The flap support structure comprises a flap support beam including an aerodynamic fairing and a drive unit including a universal support structure which rotatably receives a drive shaft connected to a drive arm for moving the trailing edge flap. The universal support structure also forms part of the flap support beam and supports the aerodynamic fairing.

SUMMARY OF THE INVENTION

It may be seen as an object of the invention to improve the load transmission within an attachment unit for aerodynamic structures.

A system and a method for load transmission are provided. Further embodiments of the invention are evident from the following description.

According to an aspect of the invention, a load introduction system is provided. The load introduction system comprises an aerodynamic component having a skin section with an aerodynamic outer surface and a first protrusion. The load introduction system further comprises an attachment unit for movably coupling the aerodynamic component to a base unit. The attachment unit is attached to the skin section of the aerodynamic component and to the first protrusion. The first protrusion extends away from the aerodynamic outer surface, thereby separating a space adjacent the aerodynamic outer surface, e.g., a space next to the aerodynamic outer surface, into a front space and a rear space, relative to the first protrusion. The attachment unit is shaped to extend over the first protrusion such that the attachment unit comprises a front portion that is at least partially arranged in the front space relative to the first protrusion and a rear portion that is at least partially arranged in the rear space relative to the first protrusion.

The inventive load introduction system provides an improved load transmission from the aerodynamic component via the attachment unit to the base unit, and vice versa. In particular, an improved load distribution can be provided by the specific design of the attachment unit which extends over, i.e., bridges, the first protrusion. Advantageously, a load transfer through the connection between the front portion and the rear portion of the attachment unit is possible, which enables an improved load transmission from both the front portion and the rear portion of the attachment unit into the aerodynamic component.

Furthermore, the load introduction via the first protrusion can be improved by the specific design of the attachment unit. This means that the length with which the first protrusion extends away from the aerodynamic outer surface can be limited or even reduced and the attachment field which attaches the attachment unit to the first protrusion may thus be smaller, since a large amount of load transmission may occur in the bridging area where the front portion is connected to the rear portion of the attachment unit. In other words, it is possible to decouple the length of the protrusion from the required minimum distance for tension loaded bolts by allowing the front portion in the front space directly "bridging" over the protrusion to the rear portion in the rear space of the protrusion. An advantage of a first protrusion having a reduced length is that the tool size for manufacturing the protrusion and its support structure can be reduced. Furthermore, the material usage can be reduced, which leads to lower non recurrent manufacturing cost, reduced energy that is required to heat up the manufacturing tool, and a faster cooling of the tool, thereby enabling a high-rate capability.

The inventive load introduction system may be part of an aircraft system. For example, the load introduction system is a mechanical device which is configured to mount aerodynamic components, in particular movables like flaps, slats, leading edge high lift devices, ailerons, spoilers, flaperons, vertical and horizontal stabilizers, elevators, rudders or doors to a corresponding base system.

In the following, the load introduction system will be mainly described as being used for the attachment and load transmission of an aircraft flap to an aircraft wing. However, it should be understood that the load introduction system can also be used for other technical applications or for attaching any other of the above-mentioned exemplary aerodynamic components.

The aerodynamic component may comprise an integrally manufactured single-piece structure. For example, the aerodynamic component may comprise or consist of a carbon fiber reinforced plastic (CFRP) material. In particular, if the aerodynamic component is a flap component, it may be designed to form a multi-cell flap design. As will be explained below, such a flap design for the aerodynamic component may additionally include one or more load introduction protrusions, including the first protrusion and possibly a second protrusion, for example fin-like protrusions, extending from the outer surface of the aerodynamic component. Such protrusions may also be made of CFRP material and/or may act as load introduction features on the aerodynamic component which at least partly receive the load transmission from the attachment unit.

The attachment unit is attached to both the skin section and to the first protrusion of the aerodynamic component. Corresponding fastening elements like bolts, screws, rivets, etc. can be used for this purpose. However, adhesive connections or material bonds are possible. The attachment unit may also be referred to as bracket herein. The attachment unit may comprise a first attachment element and a second attachment element. In particular, the attachment unit may be split into the first attachment element and the second attachment element in order to provide a redundancy in the load path within the attachment unit and thus from the aerodynamic component to the base unit. The first attachment element and the second attachment element may be connected via fastening elements like bolts, screws, rivets, etc.

The first protrusion extends away from the aerodynamic outer surface and into a free space that is located adjacent the aerodynamic outer surface of the skin section. This free space is divided into a front space and a rear space by the first protrusion, wherein the first protrusion preferably defines a plate-like structure as will be explained below. In other words, the first protrusion is arranged between the front space and the rear space such that the first protrusion separates the space adjacent the aerodynamic outer surface into the front space and the rear space with respect to the first protrusion.

The attachment unit comprises the front portion that is at least partially or entirely arranged in the front space relative to the first protrusion and the rear portion that is at least partially or entirely arranged in the rear space relative to the first protrusion. The front portion and/or the rear portion may preferably constitute metallic parts of the attachment unit. It is noted, however, that other materials like fiber reinforced materials can also be used for the front portion and/or the rear portion.

The front portion is connected to the rear portion via the bridging area which is defined by a coupling area where the front and rear portions are connected to each other. Both the front and rear portion may have a plate-like structure. Several possibilities exist for the connection between the rear portion and the front portion as will be explained in the following.

According to an embodiment, the front portion of the attachment unit and the rear portion of the attachment unit are manufactured as separate parts, wherein the front portion of the attachment unit is connected to the rear portion of the attachment unit via at least one fastening element.

In this first configuration, the front portion and the rear portion are distinct parts which may be releasably assembled to each other. The front portion and the rear portion may be milled parts which are assembled to each other via the least one fastening element, for example a bolt, a rivet, a screw, etc. A large amount of the load transmission within the attachment unit may thus occur at the fastening elements which couple the front portion to the rear portion, i.e., in the bridging area where the attachment unit extends over the first protrusion. In particular, tension loads can be transferred via the at least one fastening element.

According to an embodiment, the front portion of the attachment unit and the rear portion of the attachment unit are manufactured as separate parts, wherein the front portion of the attachment unit is connected to the rear portion of the attachment unit via a form fit connection.

In this second configuration, the front portion and the rear portion are again distinct parts which may be releasably assembled to each other. The front portion and the rear portion may be milled parts which are assembled to each other via the form fit connection. That is, instead of using fasteners to join the two portions of the attachment unit together, an integral form-fit solution can be provided. The form-fit connection may include correspondingly shaped locking features on the front portion and the rear portion, wherein these locking features engage with each other to connect the two portions. For example, one of the portions has a hook-like extension, and the other portion has a cuboid extension, which fits into the hook-like extension similar to a spring-groove-connection. This spring-groove-connection may transfer tension loads between the two portions instead of a tensioned fastening element as described with respect to the first configuration above. A large amount of the load transmission within the attachment unit may thus occur via the locking features of the form-fit connection which couples the front portion to the rear portion, i.e., in the bridging area where the attachment unit extends over the first protrusion.

According to an embodiment, the front portion of the attachment unit is connected to the rear portion of the attachment unit via a material connection, e.g., material joint.

In this third configuration, the front portion and the rear portion may share a joint in the form of a material connection which comprises fused material, like for instance a weld connection or an adhesive bond. A large amount of the load transmission within the attachment unit may thus occur via the material connection which couples the front portion to the rear portion, i.e., in the bridging area where the attachment unit extends over the first protrusion.

According to an embodiment, the attachment unit is an integrally manufactured single-piece structure that includes the front portion and the rear portion.

In this fourth configuration, the front portion and the rear portion together form one single part, for example a single milled part. The front portion and the rear portion may thus be made of the same material. In particular, the front portion and the rear portion may together define a continuous material structure that forms the entire attachment unit, i.e., the entire bracket. A large amount of the load transmission within the attachment unit may thus occur within the continuous material structure of the attachment unit, i.e., also in the bridging area where the continuous material structure of the attachment unit extends over the first protrusion.

Some of the four above-mentioned configurations for connecting the front portion to the rear portion may be combined.

According to an embodiment, the attachment unit is shaped to extend over the first protrusion in order to allow a load to be directly transmitted from the front portion into the rear portion of the attachment unit.

In other words, the attachment unit, when being mounted to the aerodynamic component, at least partially bridges the protrusion and transfers the load through the bridging area. As described above, a part of the attachment unit may form the bridging area which extends over the first protrusion such that the attachment unit extends from the front space into the rear space. The load transmission may thus be directed via the bridging area from the front portion to the rear portion and vice versa. In an exemplary load case, where a load is applied onto the front portion, a tension load may be present in the bridging area between the two portions.

According to an embodiment, the front portion is attached to the skin section in the front space and/or the rear portion is attached to the skin section in the rear space.

This attachment of the two portions to the skin section may be realized, for example, by bolts, rivets, screws, etc. However, other attachment mechanisms like material connections or form-fit connections are possible.

According to an embodiment, the front portion is attached to the first protrusion and/or the rear portion is attached to the first protrusion.

Also this attachment of the two portions to the first protrusion may be realized, for example, by bolts, rivets, screws, etc. Other attachment mechanisms like material connections or form-fit connections are possible.

According to an embodiment, the aerodynamic component comprises a second protrusion that extends from the aerodynamic outer surface of the skin section, wherein the rear portion comprises a connection element that couples the attachment unit to the second protrusion.

The second protrusion may be arranged in or near the rear space relative to the first protrusion. The rear portion may thus be elongated by the connection element in order to enable a coupling of the rear portion of the attachment unit to a further protrusion. This further protrusion, i.e., the second protrusion, may have the same or at least similar characteristics as described above with regard to the first protrusion. It is possible that the connection element is a part of the rear portion such that the connection element and the rear portion may be integrally formed. However, the connection element may also be a separate part with respect to the rear portion, which is attached to the rear portion via fastening elements, as will be further explained in the description of the Figures below. Using two protrusions on the aerodynamic component may enable a load introduction into the aerodynamic component via two separate regions on the skin section of the aerodynamic component, thus providing an improved load transmission within the attachment unit and into the surrounding structure.

According to an embodiment, the front portion comprises a first opening for receiving a coupling mechanism of the base unit in order to movably couple the base unit with the aerodynamic component.

This first opening may herein also be referred to as a lug that is configured for receiving the coupling mechanism of the base unit. The first opening of the front portion may be a hole or bore that extends through the front portion, e.g., in a spanwise direction. The first opening may accommodate a bearing element for receiving the coupling mechanism, e.g., a linkage rod, of the base unit. The bearing element may be a spherical bearing that movably, e.g., rotatably, couples the coupling mechanism of the base unit to the attachment unit. The spherical bearing may be a separate element that is inserted into the first opening. In an example, the bearing element may provide an eccentric support of the coupling mechanism, thereby eccentrically supporting the coupling mechanism in the first opening.

According to an embodiment, the load introduction system further comprises a first adjustment element for connecting the front portion of the attachment unit to the first protrusion and/or a second adjustment element for connecting the rear portion of the attachment unit to the first protrusion.

This is particularly advantageous when using an integrally manufactured part for the attachment unit, since tolerances can be compensated by adjusting a certain placement or arrangement of the adjustment element relative to the attachment unit. Such an adjustment element may have the form of a corner angle which, on the one hand, may be attached to a respective surface of the front or rear portions and, on the other hand, may be attached to the first protrusion. In this manner, the attachment unit may be manufactured such that, in the assembled state of the attachment unit in which it is attached to the aerodynamic component, gaps are provided between the attachment unit and neighboring parts like the first protrusion. This facilitates the assembly of the attachment unit to the aerodynamic component since the final attachment may be provided by the adjustment elements. It should be noted that tolerances can also be compensated by a shimming, e.g., by corresponding shimming elements.

According to an embodiment, the first protrusion which extends from the aerodynamic outer surface of the skin section is formed by a plate-like structure that extends substantially perpendicular from the aerodynamic outer surface of the skin section.

The protrusion may be a fin that protrudes from the outer surface. The fin may be part of a support structure that is covered by the skin section such that only the fin of the support structure extends through the skin section and away from the outer surface of the skin section. The fin may be fixedly arranged with respect to the skin section or may be integrally formed with the skin section. As explained above, the aerodynamic component may be a flap component, e.g., a trailing edge flap, for an aircraft wing. In this case, the fin may be oriented in a transverse direction relative to the flight direction of the aircraft. Such an orientation of the fin will be shown in the Figures described below. However, the fin can also be oriented in flight direction, i.e., parallel to the flight direction, of the aircraft. The expression "substantially perpendicular" in the present context takes into account manufacturing tolerances due to the specifically applied manufacturing technique for providing the plate-like structure at the outer surface of the skin section. Small deviations from an exactly perpendicular orientation due to the applied tools are within the scope of said expression.

The plate-like structure itself may comprise the same material as the skin section, for example a fiber reinforced material like CFRP. A metal or metal alloy can also be used. However, different materials can be used for the plate-like structure and the skin section.

According to an embodiment, the base component is a wing structure, and the aerodynamic component is a flap structure which is movably coupled to the wing structure by the attachment unit.

The wing structure may be part of an aircraft wing and the flap structure may be part of a trailing edge flap system of the aircraft wing.

According to an aspect, an aircraft comprising a load introduction system as described herein is provided.

According to another aspect, a method for manufacturing a load introduction system is provided. A step of the method comprises providing an aerodynamic component having a skin section with an aerodynamic outer surface and a first protrusion, the first protrusion extending away from the aerodynamic outer surface, thereby separating a space adjacent the aerodynamic outer surface into a front space and a rear space relative to the first protrusion. Another step of the method comprises providing an attachment unit for movably coupling the aerodynamic component to a base unit. Another step of the method comprises attaching a front portion of the attachment unit to the skin section in the front space relative to the first protrusion. Another step of the method comprises attaching a rear portion of the attachment unit to the skin section in the rear space relative to the first protrusion such that the attachment unit extends over, i.e., bridges, the first protrusion. These method steps may be performed in the indicated order.

According to an embodiment, providing the attachment unit comprises manufacturing the front portion and the rear portion of the attachment unit by milling the front portion and the rear portion, either as separate parts or as one single-piece structure, before attaching the front portion and the rear portion to the skin section.

BRIEF DESCRIPTION OF THE DRAWINGS

The present invention will hereinafter be described in conjunction with the following drawing figures, wherein like numerals denote like elements, and wherein.

DETAILED DESCRIPTION OF THE PREFERRED EMBODIMENTS

Figure 1:
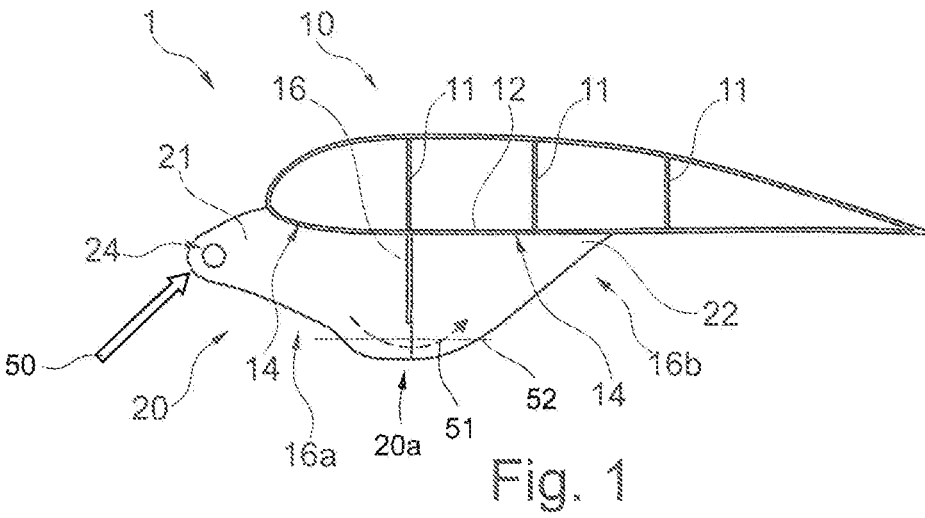
FIG. 1 shows a load transmission within load introduction system having an attachment unit extending over a first protrusion.

The representations and illustrations in the drawings are schematic and not to scale. A better understanding of the method and system described above may be obtained through a review of the illustrations accompanying this application together with a review of the detailed description that follows.

FIG. 1 shows a load transmission within load transmission system 1 having an attachment unit 20 extending over a first protrusion 16. The load introduction system 1 comprises an aerodynamic component 10 having a skin section 12 with an aerodynamic outer surface 14 and the first protrusion 16. The attachment unit 20 is configured to movably couple the aerodynamic component 10 to a base unit (not shown in FIG. 1). The attachment unit 20 is attached to the skin section 12 of the aerodynamic component 10 and to the first protrusion 16.

The aerodynamic component 10 may comprise an integrally manufactured single-piece structure. In the example shown in FIG. 1, the aerodynamic component 10 is a flap component which comprises a multi-cell flap design. This means that several cells within the flap component are separated by walls 11, e.g., spars, which are integrally manufactured with the outer skin section 12. Thus, the entire flap component may constitute an integrally manufactured single-piece component. As can be seen in FIG. 1, the first protrusion 16 extends away from the aerodynamic outer surface 14, thereby separating a space adjacent the aerodynamic outer surface 14, i.e., a free space next to the aerodynamic outer surface 14, into a front space 16a and a rear space 16b. The first protrusion 16 is formed by a plate-like structure, in particular a fin-like structure or fin, that extends substantially perpendicular from the aerodynamic outer surface 14 of the skin section 12. The fin may be part of a support structure that is covered by the skin section 12 such that only the fin of the support structure extends through the skin section 12 and away from the outer surface 14 of the skin section 12. The fin may be fixedly arranged with respect to the skin section 12 or may be integrally formed with the skin section 12.

The attachment unit 20 is shaped to extend over the first protrusion 16 such that the attachment unit 20 comprises a front portion 21 that is at least partially or completely arranged in the front space 16a relative to the first protrusion 16, and a rear portion 22 that is at least partially or completely arranged in the rear space 16b relative to the first protrusion 16. The front portion 21 may be a milled metallic part having a plat-like shape. Accordingly, the rear portion 22 may also be a milled metallic part having a plat-like shape. Both portions 21, 22 are coupled via a bridging area 20a that is defined by a part of the attachment unit 20 which extends over the first protrusion 16, i.e., a part that is arranged in a region around a tip of the first protrusion 16. The fin-like first protrusion 16 which separates the front portion 21 from the rear portion 22 may extend in the spanwise direction and may be arranged parallel to the walls 11, e.g., the spars.

Figure 2:
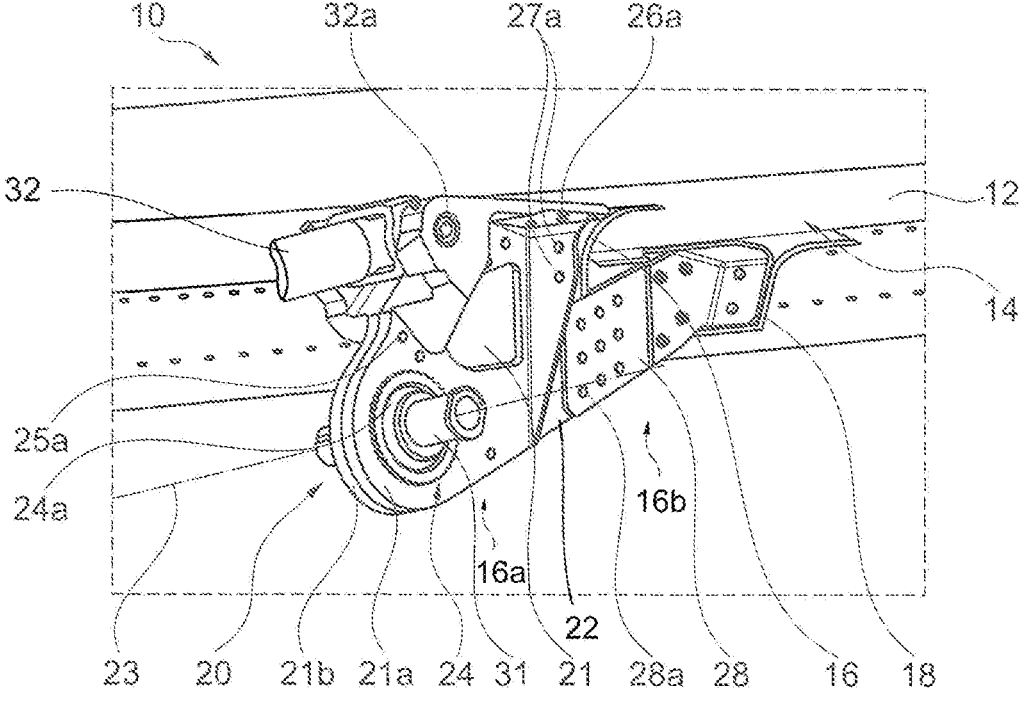
FIG. 2 shows a front perspective view of the load introduction system of FIG. 1 with a first exemplary attachment unit.

The front portion 21 comprises a first opening 24, e.g., a lug, which is adapted for receiving a bearing element 24a to support a coupling mechanism 31 of the base unit as shown in FIG. 2. In an exemplary load case as shown in FIG. 1, where a load 50 (indicated by an arrow) is applied onto the front portion 21, for example via the first opening 24, a tension load 51 (indicated by another arrow) may occur in the bridging area 20a between the two portions 21, 22. At least one fastening element like a bolt, a rivet, or a screw may couple front portion 21 to the rear portion 22. A corresponding fastening element axis 52 is also shown in FIG. 1. Due to the tension load 51 in the connection area between the front portion 21 and the rear portion 22, the fastening element may be loaded with a tension force.

The load introduction system 1 provides an improved load transmission from the aerodynamic component 10 via the attachment unit 20 to the base unit (not shown in FIG. 1), and vice versa. In particular, an improved load distribution can be provided by the specific design of the attachment unit 20 which extends over, i.e., bridges, the first protrusion 16. Advantageously, a load transfer through the connection between the front portion 21 and the rear portion 22 of the attachment unit 10 may be achieved, which enables an improved load transmission from both the front portion 21 and the rear portion 22 of the attachment unit 20 into the aerodynamic component 10.

Furthermore, the load introduction via the first protrusion 16 can be improved. In particular, the length with which the first protrusion 16 extends away from the aerodynamic outer surface 14 can be limited or reduced such that an attachment field which attaches the attachment unit 20 to the first protrusion 16 may be kept as small as possible. The attachment unit 20 has advantages with respect to the compensation of manufacturing tolerances. The two separate portions 21, 22 may be bolted together and the thickness of the fin-like protrusion 18 may have larger tolerances as well as the milled portions 21, 22 themselves. The relaxed tolerances reduce manufacturing cost and effort for shimming.

FIG. 2 shows a front perspective view of the load transmission system 1 of FIG. 1 with a first exemplary attachment unit 20. In FIG. 2, the coupling mechanism 31 and an actuation mechanism 32 are shown. As described above, the coupling mechanism 31 may couple the base unit (not shown) to the front portion 21 of the attachment unit 20. The actuation mechanism 32 may be supported via corresponding bearings seated within respective second openings 32a (only one of the second openings 32a is shown in FIG. 2) which are integrated into the front portion 21. It is noted that only some parts of the coupling mechanism 31 and the actuation mechanism 32 are shown in FIG. 2 and that these mechanisms 31, 32 may comprise further parts not shown in the Figures. The coupling mechanism 31 is movably seated within an eccentric spherical bearing element 24a which allows a certain degree of rotational movement of the coupling mechanism 31 inside the first opening 24 and around the central axis 23. The actuation mechanism 32 is movably seated within the second openings 32a which allows a certain degree of rotational movement of the coupling mechanism 32 supported by second openings 32a.

FIG. 2 again shows the load introduction system 1 with the outer surface 14 of the skin section 12 of the aerodynamic component 10 and the first protrusion 16 extending therefrom, as well as the attachment unit 20 that comprises the front portion 21 and the rear portion 22. The front portion 21 is attached to the skin section 12 via fastening elements 26a, for example bolts, rivets, screws and the like. Additionally, the front portion 21 is attached to the first protrusion 16 via fastening elements 27a, for example bolts, rivets, screws and the like.

As shown in FIG. 2, the attachment unit 20 can be split into a first attachment element 21a and a second attachment element 21b which, in an assembled state of the attachment unit 20, are connected to each other via fastening elements 25a, for example bolts, rivets, screws and the like. In particular, one or both of the front portion 21 and the rear portion 22 may be split into these first and second attachment elements 21a, 21b. The fastening elements 25a may include bolts, screws, rivets, etc., that extend through the structure of the first and second attachment elements 21a, 21b. However, it is noted that the front portion 21 and/or the rear portion 22 are not split into sub-elements. This is shown for example in FIG. 3 where no splitting line for separating the elements 21a and 21b as shown in FIG. 2 is present.

In FIG. 2, it is also recognizable that the attachment unit 20 extends over the first protrusion 16, i.e., from the front space 16a to the rear space 16b. Furthermore, a connection element 28 is attached to the attachment unit 20, in particular, to the rear portion 22 of the attachment unit 20. The attachment unit 20 may thus be attached to the skin section 12 and to the first protrusion 16 via the fastening elements 26a and 27a, respectively, but also via the connection element 28 to a further connecting region on the outer surface 14 of the skin section 12. In other words, the attachment unit 20 may be attached to the skin section 12 at two separate connecting regions on the outer surface 14, wherein these connecting regions are arranged at different sides of the first protrusion 16. The connection element 28 may be fastened to a second protrusion 18, for example using fastening elements like bolts, screws, rivets, etc. The second protrusion 18 may be arranged in the rear space 16b relative to the first protrusion 16. The connection element 28 may additionally be fastened to a region on the outer surface 14 of the skin section 12 adjacent the second protrusion 18, for example using fastening elements like bolts, screws, rivets, etc. The connection element 28 may be part of the rear portion 22 of the attachment unit 20. In the example illustrated in FIG. 2, however, the connection element 28 is a separate part which connects the rear portion 22 with the second protrusion 18. In this case, the connection element 28 is coupled to the rear portion 22 via the fastening elements 28a.

Figure 3:
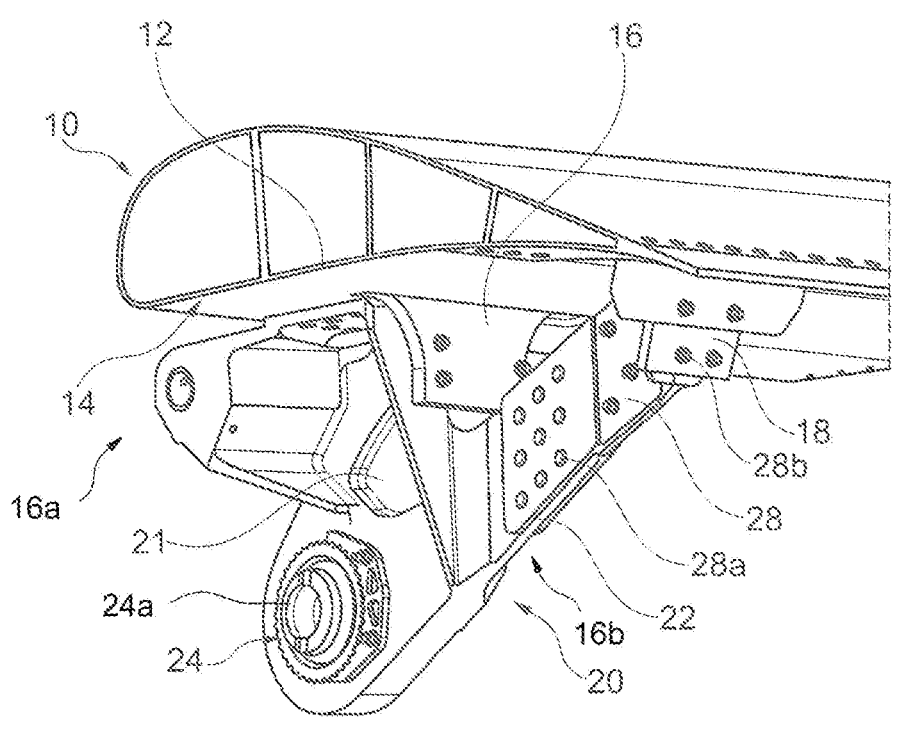
FIG. 3 shows a rear perspective view of the first exemplary attachment unit of FIG. 2.

FIG. 3 shows a rear perspective view of the first exemplary attachment unit 20 of FIG. 2. In this Figure, the first protrusion 16 and the second protrusion 18 can be clearly recognized. The attachment unit 20 is attached to both protrusions 16, 18 in order to couple the attachment unit 20 to the aerodynamic component 10. The front portion 21 of the attachment unit 20 is further attached onto the outer surface 14 of the skin section 12 of the aerodynamic component 10. Again, the first opening 24 which accommodates the bearing element 24a for coupling the base unit is shown.

FIG. 3 gives a better impression of the appearance of the connection element 28 which connects the rear portion 22 to the second protrusion 18 as well as to the surface region on the outer surface 14 nearby the second protrusion 18. The connection element 28 comprises two flanges at a first end of the connection element 28 where the connection element 28 is attached to the rear portion 22. In particular, the two flanges are arranged on both sides of the plate-like rear portion 22 of the attachment unit 20 and engage the rear portion 22 as shown in FIG. 3. It is noted that fastening elements 28a, for example bolts, rivets, screws and the like, may be provided for fastening the connection element 28 to the rear portion 22. Further attachment elements 28b, for example bolts, rivets, screws and the like, are provided for fastening a second end of the connection element 28 to the second protrusion 18.

As can be clearly seen in FIG. 3, this first exemplary attachment unit 20 extends over the first protrusion 16, i.e., bridges the first protrusion 16. In particular, the attachment unit 20 extends from the front space 16a in which the front portion 21 is located to the rear space 16b in which the rear portion 22 is located.

Figure 4:
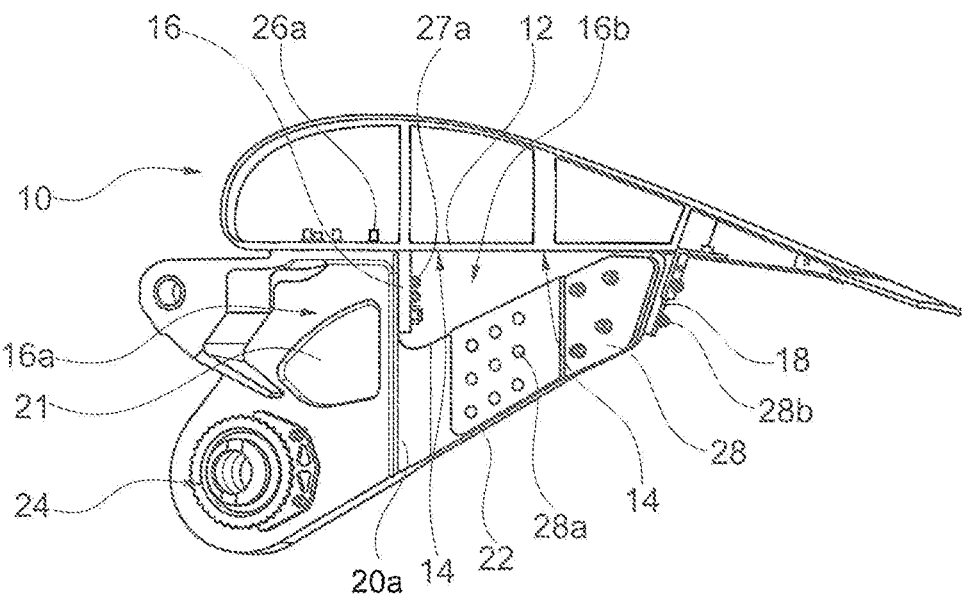
FIG. 4 shows a side view of the first exemplary attachment unit of FIG. 2.

FIG. 4 shows a side view of the first exemplary attachment unit 20 of FIG. 2. In FIG. 4, the bridging character of the attachment unit 20 can be clearly recognized. In particular, this first exemplary attachment unit 20 extends over the first protrusion 16 such that a free space remains in an angle region of the rear space 16b where the first protrusion 16 is connected to the outer surface 14 of the skin section 12. That is, the specified free space in the angle region of the rear space 16b is not occupied by the rear portion 22. In the rear space 16b, the rear portion 22 may thus have a specified distance to the outer surface 14 of the skin section 12. In contrast, the front space 16a may be completely occupied by the front portion 21. In particular, an angle region in the front space 16a where the first protrusion 16 is connected to the outer surface 14 of the skin section 12 is entirely occupied by the front portion 21. The front portion 21 thus directly contacts the outer surface 14 of the skin section 12 such that the front portion 21 is attached to the skin section 12 of the aerodynamic component 10 via the fastening elements 26a. Additionally, the front portion 21 directly contacts the first protrusion 16 such that the front portion 21 is attached to the first protrusion 16 of the aerodynamic component 10 via the fastening elements 27a.

Again, the first opening 24 in the front portion 21 as well as the connection element 28 is shown in FIG. 4. As described above, the connection element 28 is attached to the rear portion 22 via the attachment elements 28a and to the second protrusion 18 via the attachment elements 28b.

FIG. 4 shows that an attachment field of the attachment elements 28*a* is provided to attach the two flanges of the connection element 28 to the rear portion 22.

FIG. 4 also shows that the front portion 21 and the rear portion 22 of the attachment unit 20 are manufactured as a single-piece structure which extends over the first protrusion 16. In particular, the bridging area 20*a* which connects the front portion 21 to the rear portion 22 is formed by a material structure between the front portion 21 and the rear portion 22. The first exemplary attachment element 20 is thus an integrally manufactured single-piece structure extending over the first protrusion 16.

Figure 5:
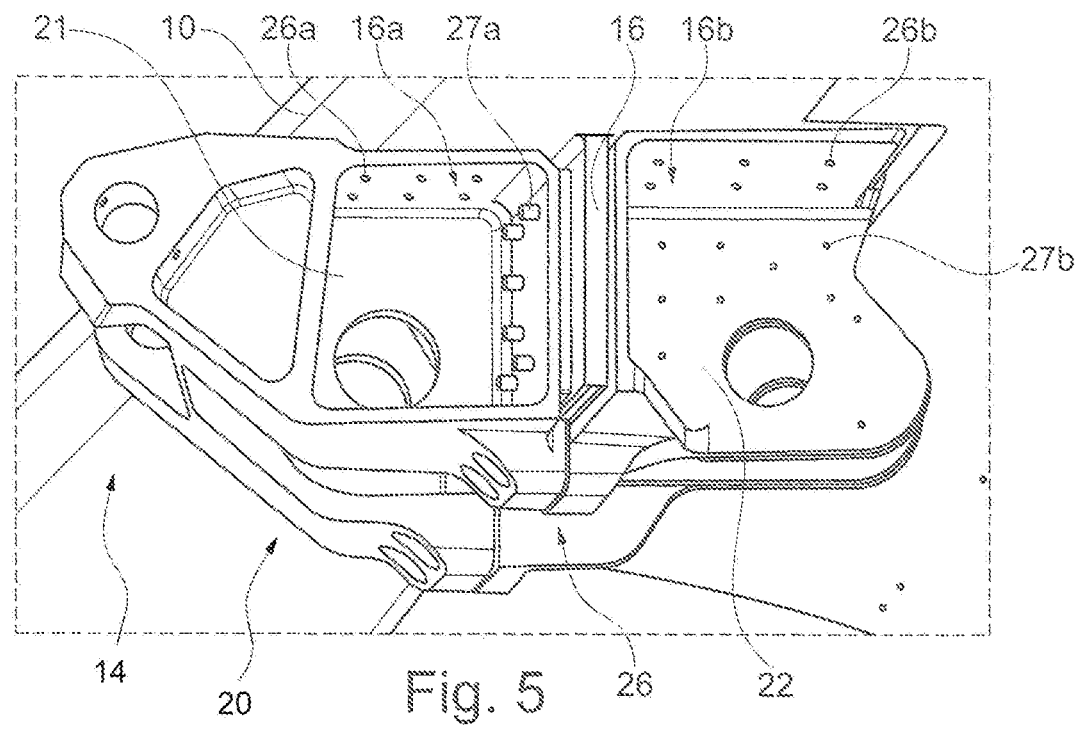
FIG. 5 shows a perspective view of the load introduction system of FIG. 1 with a second exemplary attachment unit.

FIG. 5 shows a perspective view of the load transmission system 1 of FIG. 1 with a second exemplary attachment unit 20. In this example, the front portion 21 and the rear portion 22 are manufactured as two distinct parts which are connected to each other via a fastening region 26 which comprises at least one fastening element (not shown).

A large amount of load transmission within the attachment unit 20 occurs at the fastening region 26 which couples the front portion 21 to the rear portion 22, i.e., in the bridging area where the attachment unit 20 extends over the first protrusion 16. In particular, tension loads can be transferred via the fastening element of the fastening region 26. Therefore, in the exemplary attachment unit 20 shown in FIG. 6, the fastening region 26 extends over, i.e., bridges, the first protrusion 16.

The front portion 21, which is arranged in the front space 16*a*, is attached via the fastening elements 26*a* onto the outer surface 14 of the aerodynamic component 10 and is also attached via the fastening elements 27*a* to the first protrusion 16. The rear portion 22, which is arranged in the rear space 16*b*, is attached via the fastening elements 26*b* onto the outer surface 14 of the aerodynamic component 10. It is noted that the attachment elements 27*a* may be configured to attach not only the front portion 21 to the first protrusion 16, but also the rear portion 22 to the first protrusion 16. In particular, the fastening elements 27*a* may be bolts, rivets, screws, etc. which extend through a flange region of the front portion 21, through the first protrusion 16 and through a flange region of the rear portion 22, in order to couple both the front portion 21 and the rear portion 22 to the first protrusion 16. The rear portion 22 may be composed of multiple parts being attached to each other via a fastening elements 27*b*.

Figure 6:
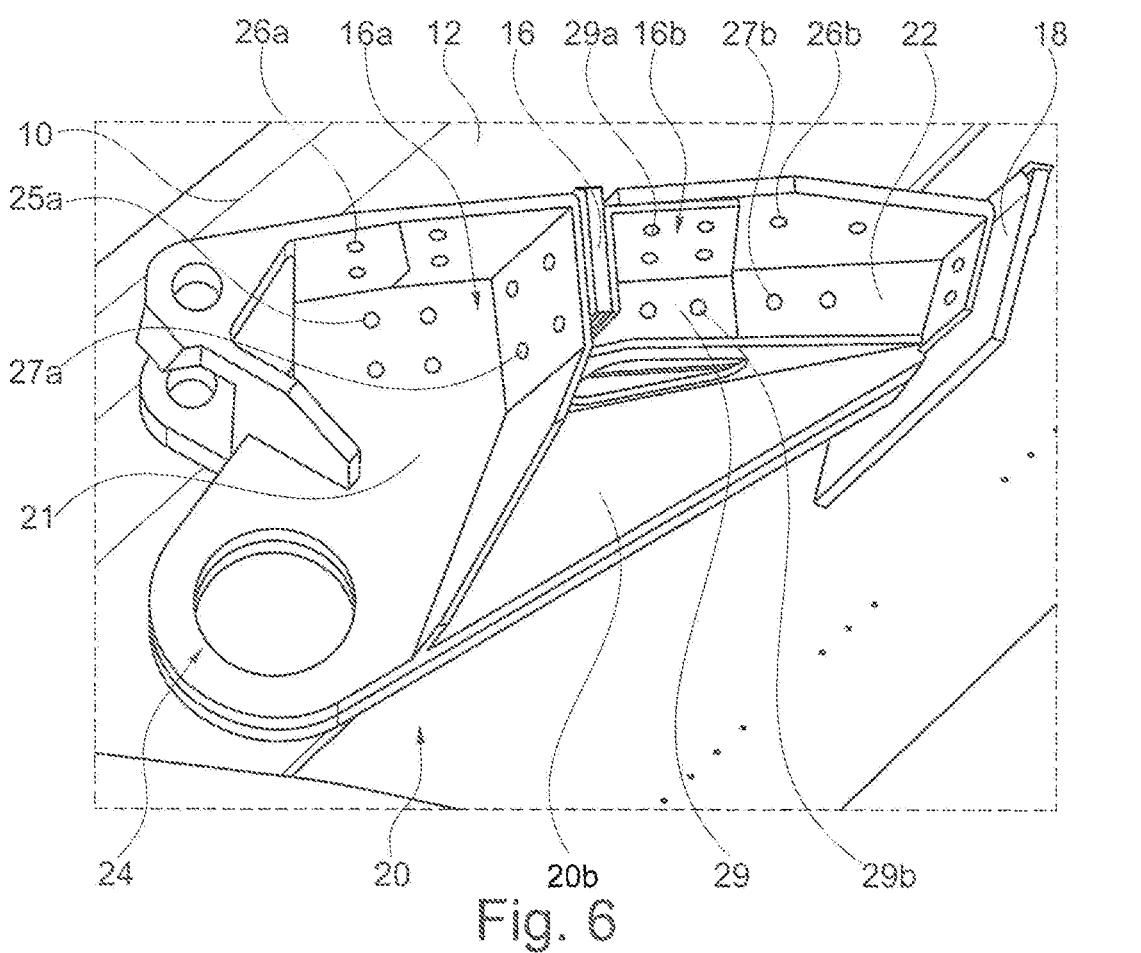
FIG. 6 shows a perspective view of the load introduction system of FIG. 1 with a third exemplary attachment unit.

FIG. 6 shows a perspective view of the load transmission system of FIG. 1 with a third exemplary attachment unit 20. The attachment unit 20 is an integrally manufactured single-piece structure 20*b* that includes the front portion 21 and the rear portion 22. It should be understood that, in further exemplary attachment units 20, the front portion 21 of the attachment unit 20 may also be connected to the rear portion 22 of the attachment unit 20 via a material connection, e.g., a material joint.

In the single-piece configuration of FIG. 6, the front portion 21 and the rear portion 22 together form one single part 20*b*, for example a single milled part. The front portion 21 and the rear portion 22 may thus be made of the same material. In particular, the front portion 21 and the rear portion 22 may together define a continuous material structure that forms the entire attachment unit 20, i.e., the entire bracket. A large amount of load transmission within the attachment unit 20 may thus occur within the continuous material structure of the attachment unit 20, i.e., also in the bridging area where the continuous material structure of the attachment unit 20 extends over the first protrusion 16.

It is noted that the front portion 21 abuts against the first protrusion 16 such that the front portion 21 can be attached to the first protrusion 16 via the fastening elements 27*a*. The rear portion 22 may also be attached to the first protrusion 16. Since both portions 21, 22 are portions of the single-piece structure 20*b*, tolerance gaps between the front portion 21 and the first protrusion 16 as well as between the rear portion 22 and the first protrusion 16 may be required. These gaps may be compensated by using shimming elements or by using additional adjustment elements 29. An exemplary adjustment element 29, e.g., a corner angle, is shown in FIG. 6. This adjustment element 29 is configured for connecting the rear portion 22 of the attachment unit 20 to the first protrusion 16. The tolerance compensation may be adjusted by the specific attachment of the adjustment element 29 to the rear portion 22 via the fastening elements 29*a* and 29*b*, as shown in FIG. 6. The fastening elements 29*a* fix the position of the adjustment element 29 with respect to the rear portion 22 and with respect to the skin section 12. The fastening elements 29*b* fix the position of the adjustment element 29 with respect to the rear portion 22. Analogously, another adjustment element (not shown) for connecting the front portion 21 of the attachment unit 20 to the first protrusion 16 may be provided. A similar concept may be considered for the connection of the rear portion 22 to the second protrusion 18 where another adjustment element could be placed for compensating manufacturing tolerances that may be required for accurately placing and attaching the attachment unit 20 relative to the second protrusion 18.

Again, the front portion 21, which is arranged in the front space 16*a*, is attached via the fastening elements 26*a* onto the skin section 12 of the aerodynamic component 10 and is also attached via the fastening elements 27*a* to the first protrusion 16. The rear portion 22, which is arranged in the rear space 16*b*, is attached via the fastening elements 26*b* onto the skin section 12 of the aerodynamic component 10. It is noted that the attachment elements 27*a* may be configured to attach not only the front portion 21 to the first protrusion 16, but also the adjustment element 29 to the first protrusion 16. In particular, the fastening elements 27*a* may be bolts, rivets, screws, etc. which extend through a flange region of the front portion 21, through the first protrusion 16 and through a flange region of the adjustment element 29, in order to couple both the front portion 21 and the adjustment element 29 to the first protrusion 16. The attachment element 20 may be composed of multiple parts being attached to each other via fastening elements 27*b*. In particular, the attachment element 20 can be split into a first attachment element and a second attachment element as described above with respect to FIG. 2, wherein both attachment elements may extend over the first protrusion 16. The two attachment elements may be attached to each other via the fastening elements 25*a* in the front portion 21 and via the fastening elements 27*b* in the rear portion 22. The first opening 24 may extend through both attachment elements, i.e., through the attachment unit 20.

Figure 7:
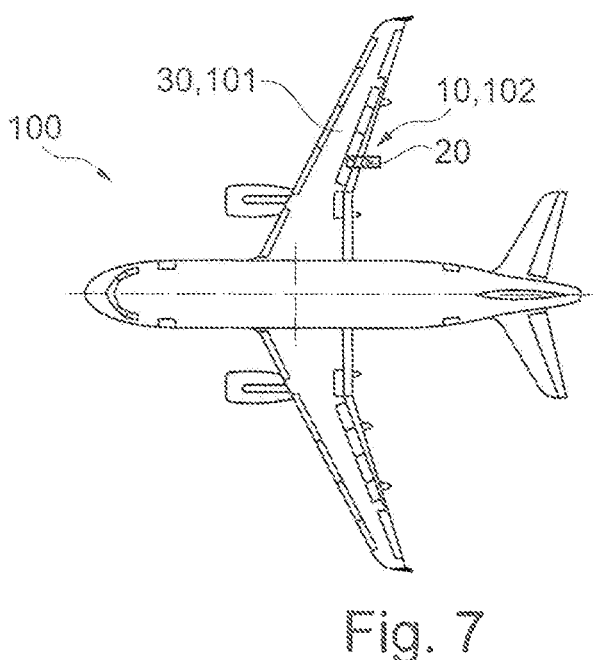
FIG. 7 shows an aircraft comprising the load introduction system of FIG. 1.

FIG. 7 shows an aircraft 100 comprising the load introduction system 1 of FIG. 1. The aerodynamic component 10 is a flap structure 102 which is movably coupled to a wing structure 101 by the attachment unit 20. In other words, the base component 30 is formed by the wing structure 101 to which the flap structure 102 is fastened via the attachment unit 20 and the coupling mechanism 31 (cf. also FIG. 2).

Figure 8:
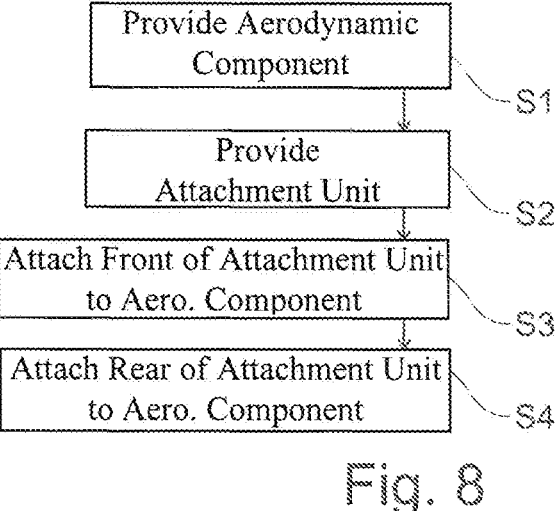
FIG. 8 shows a method for manufacturing a load introduction system.

FIG. 8 shows a method for manufacturing a load introduction system, for example the load introduction system 1 of FIG. 1 above. In a step S1 of the method, an aerodynamic component 10 having a skin section 12 with an aerodynamic outer surface 14 and a first protrusion 16 is provided, wherein the first protrusion 16 extends away from the aerodynamic outer surface 14, thereby separating a space adjacent the aerodynamic outer surface 14 into a front space 16a and a rear space 16b. In a step S2 of the method, an attachment unit 20 for movably coupling the aerodynamic component 10 to a base unit 30 is provided. In a step S3 of the method, a front portion 21 of the attachment unit 20 is attached to the skin section 12 in the front space 16a relative to the first protrusion 16. In a step S4 of the method, a rear portion 22 of the attachment unit 20 is attached to the skin section 12 in the rear space 16b relative to the first protrusion 16 such that the attachment unit 20 extends over, i.e., bridges, the first protrusion 16.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A load introduction system, comprising:
an aerodynamic component having a skin section with an aerodynamic outer surface and a first protrusion;
an attachment unit for movably coupling the aerodynamic component to a base unit;
wherein the attachment unit is attached to the skin section of the aerodynamic component and to the first protrusion;
wherein the first protrusion extends away from the aerodynamic outer surface, thereby separating a space adjacent the aerodynamic outer surface into a front space fore of the first protrusion and a rear space aft of the first protrusion, the first protrusion having an outermost extent spaced from the aerodynamic outer surface;
wherein the attachment unit has a bridging area extending from the front space to the rear space over the outermost extent of the first protrusion such that the attachment unit comprises a front portion that is at least partially arranged in the front space relative to the first protrusion and a rear portion that is at least partially arranged in the rear space relative to the first protrusion, wherein the attachment unit is attached to the first protrusion at a point on the first protrusion spaced from aerodynamic outer surface.

2. The load introduction system according to claim 1, wherein the front portion of the attachment unit and the rear portion of the attachment unit are manufactured as separate parts;
wherein the front portion of the attachment unit is connected to the rear portion of the attachment unit via at least one fastening element.

3. The load introduction system according to claim 1, wherein the front portion of the attachment unit and the rear portion of the attachment unit are manufactured as separate parts;
wherein the front portion of the attachment unit is connected to the rear portion of the attachment unit via a form fit connection.

4. The load introduction system according to claim 1, wherein the front portion of the attachment unit is connected to the rear portion of the attachment unit via a material connection.

5. The load introduction system according to claim 1, wherein the attachment unit is an integrally manufactured single-piece structure that includes the front portion and the rear portion.

6. The load introduction system according to claim 1, wherein the attachment unit is shaped to extend over the first protrusion in order to allow a load to be directly transmitted from the front portion into the rear portion of the attachment unit.

7. The load introduction system according to claim 1, wherein the front portion is attached to the skin section in the front space; or
wherein the rear portion is attached to the skin section in the rear space; or
both.

8. The load introduction system according to claim 1, wherein the front portion is attached to the first protrusion; or
wherein the rear portion is attached to the first protrusion; or
both.

9. The load introduction system according to claim 1, wherein the aerodynamic component comprises a second protrusion that extends from the aerodynamic outer surface of the skin section, and
wherein the rear portion comprises a connection element that couples the attachment unit to the second protrusion.

10. The load introduction system according to claim 1, wherein the front portion comprises a first opening for receiving a coupling mechanism of the base unit in order to movably couple the base unit with the aerodynamic component.

11. The load introduction system according to claim 1, further comprising:
a first adjustment element for connecting the front portion of the attachment unit to the first protrusion; or
a second adjustment element for connecting the rear portion of the attachment unit to the first protrusion; or
both.

12. The load introduction system according to claim 1, wherein the first protrusion which extends from the aerodynamic outer surface of the skin section is formed by a structure that extends substantially perpendicular from the aerodynamic outer surface of the skin section.

13. The load introduction system according to claim 1, wherein the base unit is a wing structure; and
wherein the aerodynamic component is a flap structure which is movably coupled to the wing structure by the attachment unit.

14. An aircraft comprising:
the load introduction system according to claim 1.

15. A method for manufacturing a load introduction system, comprising:
providing an aerodynamic component having a skin section with an aerodynamic outer surface and a first protrusion, the first protrusion extending away from the aerodynamic outer surface, thereby separating a space adjacent the aerodynamic outer surface into a front space fore of the first protrusion and a rear space aft of the first protrusion, the first protrusion having an outermost extent spaced from the aerodynamic outer surface;

providing an attachment unit for movably coupling the aerodynamic component to a base unit;

attaching a front portion of the attachment unit to the skin section in the front space relative to the first protrusion;

attaching a rear portion of the attachment unit to the skin section in the rear space relative to the first protrusion such that the attachment unit extends over the first protrusion; and attaching the attachment unit to the first protrusion at a point on the first protrusion spaced from aerodynamic outer surface, wherein the attachment unit has a bridging area extending from the front space to the rear space over the outermost extent of the first protrusion such that the attachment unit comprises a front portion that is at least partially arranged in the front space relative to the first protrusion and a rear portion that is at least partially arranged in the rear space relative to the first protrusion.

\* \* \* \* \*